United States Patent
Shintani et al.

(10) Patent No.: US 10,491,800 B2
(45) Date of Patent: Nov. 26, 2019

(54) IMAGING APPARATUS

(71) Applicant: Olympus Corporation, Hachioji-shi, Tokyo (JP)

(72) Inventors: Koichi Shintani, Hachioji (JP); Katsuhisa Kawaguchi, Atsugi (JP); Masaomi Tomizawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 28 days.

(21) Appl. No.: 15/629,227

(22) Filed: Jun. 21, 2017

(65) Prior Publication Data
US 2017/0371231 A1 Dec. 28, 2017

(30) Foreign Application Priority Data

Jun. 22, 2016 (JP) .................................. 2016-123342

(51) Int. Cl.
*H04N 5/232* (2006.01)
*H04N 19/513* (2014.01)
*G02B 7/09* (2006.01)
*G03B 13/36* (2006.01)
*H04N 5/262* (2006.01)
(Continued)

(52) U.S. Cl.
CPC ........... *H04N 5/23212* (2013.01); *G02B 7/09* (2013.01); *G02B 7/38* (2013.01); *G03B 13/36* (2013.01); *G06T 1/20* (2013.01); *H04N 1/00* (2013.01); *H04N 5/217* (2013.01);
(Continued)

(58) Field of Classification Search
None
See application file for complete search history.

(56) References Cited

U.S. PATENT DOCUMENTS

2010/0157072 A1* 6/2010 Luo ................. H04N 5/145
    348/208.4
2013/0215290 A1* 8/2013 Solhusvik ........... H04N 5/2355
    348/231.99
(Continued)

FOREIGN PATENT DOCUMENTS

| CN | 105100594 A | 11/2015 |
| JP | 2011-43646 | 3/2011 |

OTHER PUBLICATIONS

Notification of First Office Action for Chinese Patent Application No. 201710464425.1, dated Sep. 2, 2019 (6 pgs.), with English translation (11pgs.).

*Primary Examiner* — Mark T Monk
(74) *Attorney, Agent, or Firm* — John C. Pokotylo; Pokotylo Patent Services

(57) ABSTRACT

An imaging apparatus includes an imaging element, an imaging lens, an AF controller, an image synthesis unit, and a display. The imaging element captures multiple images of an object to obtain a plurality of image data. The imaging lens includes a focus lens and is used for generating an image of the object in the imaging element. The AF controller controls a focus state of the imaging lens. The image synthesis unit synthesizes a region with a large amount of blurriness in image data of a current frame and a region with a small amount of blurriness in image data of a preceding frame obtained before the image data of the current frame, among the plurality of image data obtained by the imaging element by the plurality of times of image capturing during the drive of the focus lens. The display displays an image synthesized by the image synthesis unit.

7 Claims, 6 Drawing Sheets

(51) Int. Cl.
*H04N 1/00* (2006.01)
*G06T 1/20* (2006.01)
*H04N 5/217* (2011.01)
*G02B 7/38* (2006.01)

(52) U.S. Cl.
CPC ..... *H04N 5/23232* (2013.01); *H04N 5/23293* (2013.01); *H04N 5/262* (2013.01); *H04N 19/513* (2014.11)

(56) References Cited

U.S. PATENT DOCUMENTS

2014/0354875 A1* 12/2014 Ogawa ............... H04N 5/23212
  348/349
2015/0326798 A1 11/2015 Muto et al.

* cited by examiner

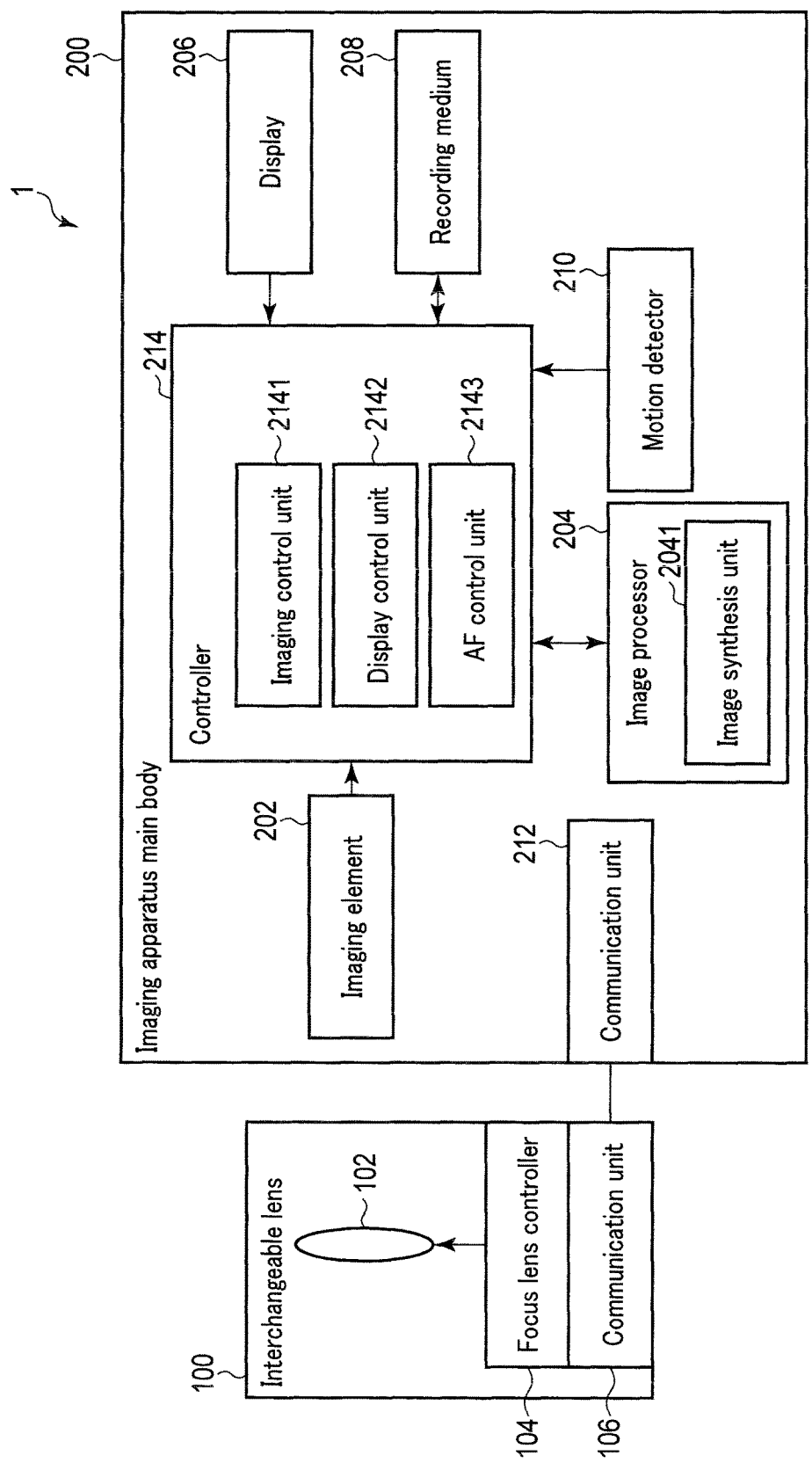
F I G. 1

IMAGING APPARATUS

CROSS-REFERENCE TO RELATED APPLICATIONS

This application is based upon and claims the benefit of priority from the prior Japanese Patent Application No. 2016-123342, filed Jun. 22, 2016, the entire contents of which are incorporated herein by reference.

BACKGROUND OF THE INVENTION

1. Field of the Invention

The present invention relates to an imaging apparatus having an AF function.

2. Description of the Related Art

A contrast AF method is known as an auto-focus adjustment technique for an imaging lens provided in an imaging apparatus. The contrast AF method is a method for adjusting focus of a focus lens based on a contrast value calculated from an image signal generated in accordance with a luminous flux received by an imaging element via an imaging lens. For example, wobbling drive is performed in the contrast AF method to determine a drive direction of a focus lens moving to focus. Wobbling drive is a technique of determining a drive direction of a focus lens moving to focus, while minutely driving the focus lens in a near focus direction and an infinite focus direction, by comparing a contrast value when driving the focus lens into the near focus direction with a contrast value when driving the focus lens into the infinite focus direction. With recent imaging apparatuses, contrast AF may be performed with wobbling drive even during Live View display, etc. In wobbling drive, a focus lens is driven in a direction to reduce a contrast value, in other words, to cause greater blurriness, for the purpose of contrast value comparison. For this reason, if lens drive, such as wobbling drive, etc., is performed during Live View display, a blurry image due to the lens drive may be displayed. The imaging apparatus disclosed in Jpn. Pat. Appln. KOKAI Publication No. 2011-43646 performs processing of correcting a blurry image due to wobbling drive when AF is performed with wobbling drive during Live View display. Specifically, to correct the blurriness, the imaging apparatus disclosed in Jpn. Pat. Appln. KOKAI Publication No. 2011-43646 generates a blurriness function representing blurriness from various information related to wobbling and corrects the blurriness by performing deconvolution processing on the blurriness function.

BRIEF SUMMARY OF THE INVENTION

According to an aspect of the invention, there is provided an imaging apparatus comprising: an imaging element which captures multiple images of an object to obtain a plurality of image data of the object; an imaging lens including a focus lens and used for generating an image of the object in the imaging element; an AF controller which controls a focus state of the imaging lens by controlling drive of the focus lens; an image synthesis unit which synthesizes a region with a large amount of blurriness in image data of a current frame and a region with a small amount of blurriness in image data of a preceding frame obtained before the image data of the current frame, among the plurality of image data obtained by the imaging element by the plurality of times of image capturing during the drive of the focus lens; and a display which displays an image synthesized by the image synthesis unit.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

FIG. 1 is a diagram of an imaging apparatus according to a first embodiment of the present invention.

DETAILED DESCRIPTION OF THE INVENTION

Figure 2:
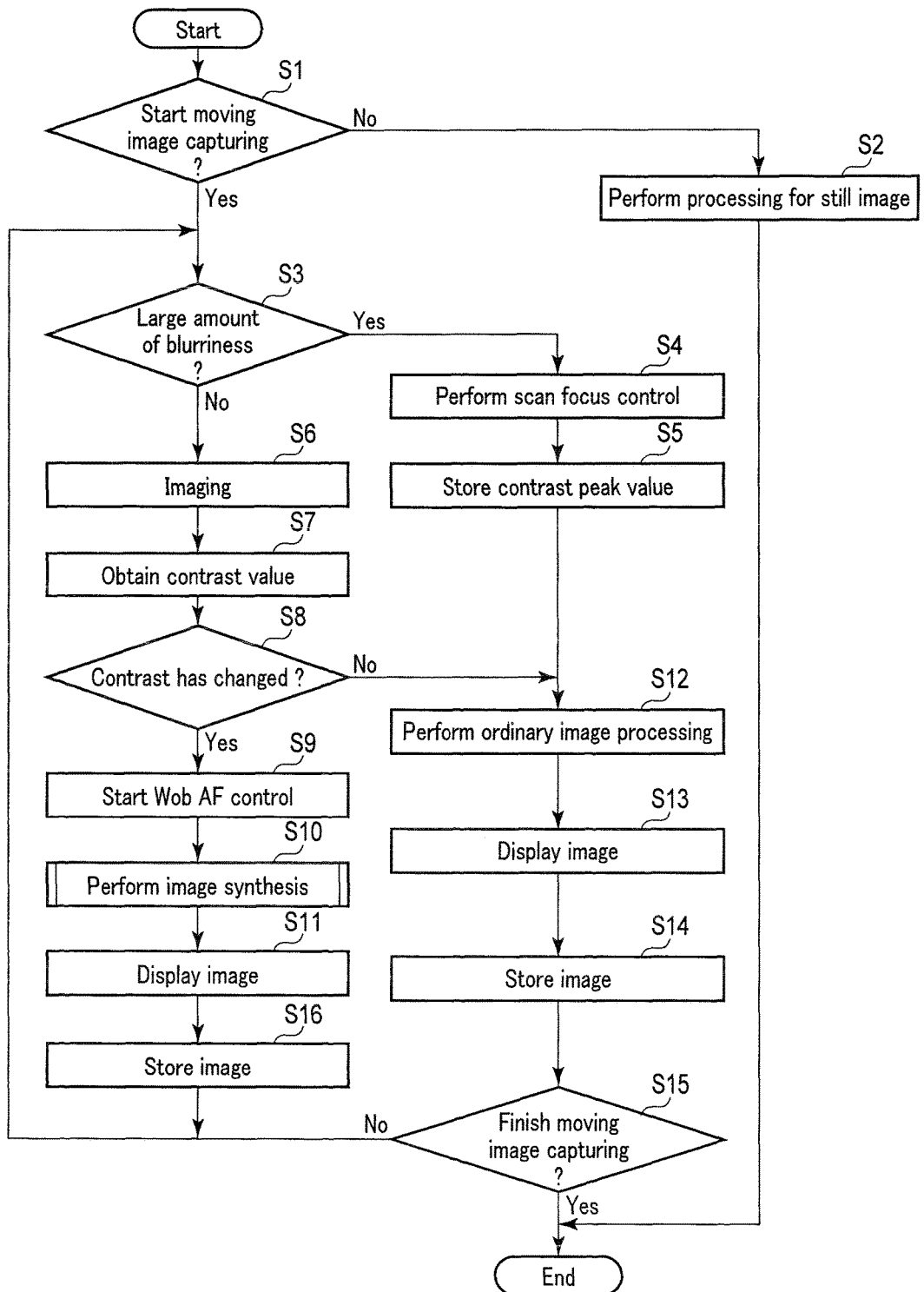
FIG. 2 is a flowchart showing imaging processing in the imaging apparatus according to each of the embodiments of the present invention.

Hereinafter, embodiments of the present invention will be described with reference to the drawings.

First Embodiment

The first embodiment of the present invention is first described. FIG. 1 is a schematic diagram of an imaging apparatus according to the first embodiment of the present invention. The imaging apparatus 1 shown in FIG. 1 includes an interchangeable lens 100 and an imaging apparatus main body 200. The interchangeable lens 100 is detachable to the imaging apparatus main body 200. The attachment of the interchangeable lens 100 to the imaging apparatus main body 200 establishes a communication-enabling connection between the interchangeable lens 100 and the imaging apparatus main body 200. The imaging apparatus 1 is not necessarily a lens-interchangeable-type imaging apparatus. For example, the imaging apparatus 1 may be a lens-integral-type imaging apparatus.

The interchangeable lens 100 includes an imaging lens 102, a focus lens controller 104, and a communication unit 106.

The imaging lens 102 includes diaphragm and lenses, and allows a luminous flux from an object (not illustrated) to enter an imaging element 202 of the imaging apparatus main body 200. The imaging lens 102 includes a focus lens for adjusting an in-focus state.

The focus lens controller 104 adjusts the in-focus state of the imaging lens 102 by driving the focus lens in an optical axis direction under the control by the controller 214 of the imaging apparatus main body 200.

When the interchangeable lens 100 is attached to the imaging apparatus main body 200, the communication unit 106 is connected to the communication unit 212 of the imaging apparatus main body 200 to mediate a communication between the interchangeable lens 100 and the imaging apparatus main body 200.

The imaging apparatus main body 200 includes an imaging element 202, an image processor 204, a display 206, a recording medium 208, a motion detector 210, a communication unit 212, and a controller 214.

The imaging element 202 captures an image of an object and obtains image data relating to the object.

The image processor 204 performs various kinds of image processing for the image data obtained by the imaging element 202. The imaging processing includes white balance processing and graduation correction processing, etc. The image processor 204 includes an image synthesis unit 2041. The image synthesis unit 2041 performs image synthesis processing to synthesize a plurality of image data.

The display 206 is a liquid crystal display or an organic EL display, for example, and displays a variety of images, such as images based on image data obtained by the imaging element 202.

The recording medium 208 is a non-volatile memory, such as a flash memory, etc., and is a storage medium for storing a variety of data. The recording medium 208 stores an image file acquired as a result of, for example, an imaging operation. The recording medium 208 stores a program used for controlling the imaging apparatus main body 200.

The motion detector 210 detects a movement of an object among image data of a plurality of frames acquired by the imaging element 202. The motion of the object is detected by detecting a motion vector among image data of a plurality of frames, for example.

When the interchangeable lens 100 is attached to the imaging apparatus main body 200, the communication unit 212 is connected to the communication unit 106 of the imaging apparatus main body 200 to mediate a communication between the interchangeable lens 100 and the imaging apparatus main body 200.

The controller 214 is a control circuit, such as a CPU and an ASIC, etc., and centralizes the operation of the imaging apparatus main body 200. The controller 214 has a function as an imaging control unit 2141, a function as a display control unit 2142, and a function as an AF control unit 2143. Herein, each of the functions of the controller 214 may be realized by a single unit of either hardware or software, or by a combination of a plurality of hardware or software. Some of the functions may be provided separately from the controller 214.

The imaging control unit 2141 controls operation of imaging an object by the imaging element 202 and read operation for image data from the imaging element 202. The display control unit 2142 controls displaying a variety of images on the display 206. The AF control unit 2143 performs, for example, AF control in accordance with the contrast AF method that involves wobbling drive (hereinafter, referred to as "Wob AF control"). The wobbling AF control is a technique of determining a drive direction of a focus lens moving to focus, while minutely driving the focus lens in a near focus and infinite focus directions, by comparing a contrast value at a near edge of an amplitude when driving the focus lens in a near direction with a contrast value at an indefinite edge of an amplitude when driving the focus lens in an infinite direction. The AF control unit 2143 may be configured to perform AF control in accordance with a phase-difference AF method.

Next, the operation of the imaging apparatus according to the present embodiment will be described. FIG. 2 is a flowchart showing the imaging processing of the imaging apparatus according to the present embodiment. The processing shown in FIG. 2 is carried out by the controller 214. Herein, the imaging apparatus 1 has a still image mode and a moving image mode as imaging modes. A still image mode is an imaging mode for recording a still image. A moving image mode is an imaging mode for recording a moving image. The setting of these imaging modes is done by a user's operation of an unillustrated operation unit. The imaging apparatus may have modes other than imaging modes, for example, playback modes.

The processing shown in FIG. 2 is started upon turning the imaging apparatus 1 on, for example. In step S1, the controller 214 determines whether moving image capturing by the imaging apparatus 1 should be started or not. For example, if an unillustrated operating member which instructs to start moving image capturing is operated, it is determined that the moving image capturing should be started. In step S1, if it is determined that the moving image capturing should not be started, in other words, still image capturing should be started, the processing proceeds to step S2. In step S1, if it is determined that the moving image capturing should be started, the processing proceeds to step S3.

In step S2, the controller 214 performs imaging processing for still images. The imaging processing for still images is described briefly. In the imaging processing for still images, the controller 214 drives the focus lens to an in-focus position by Wob AF, etc. After that, upon inputting of a user's operation to start still image capturing, the controller 214 has the imaging element 202 execute still image capturing, and stores a still image file obtained by the still image capturing. After the still imaging processing, the processing of FIG. 2 is finished.

In step S3, the controller 214 determines whether a current amount of blurriness is large or not. In the contrast AF method, an amount of blurriness is expressed by a contrast value indicating a contrast of an object. A contrast value is calculated by accumulating high-frequency components of image data corresponding to an AF area that is set in an imaging region. The greater a contrast value is, the higher the contrast of an object is (i.e., an amount of blurriness is small). Thus, in step S3, it is determined whether or not a contrast value is below a threshold, for example. If it is determined that the contrast value is below a threshold, in other words, if an amount of blurriness is large (e.g., in an out-of-focus state) in step S3, the processing proceeds to step S4, as it takes time to focus with the wobbling AF control. If it is determined that the contrast value exceeds a threshold, in other words if an amount of blurriness is small (e.g., in an in-focus state) in step S3, the processing proceeds to step S6 to perform the wobbling AF control. A predetermined initial value is set as a threshold when the power is turned on. A peak value that is obtained after performing a later-described scan focus control may be replaced with the initial value and stored as a threshold.

In step S4, the controller 214 performs scan focus control. In the scan focus control, the controller 214 sends an instruction to the focus lens controller 104 to continuously drive the focus lens in either a near focus direction or an infinite focus direction so as to increase a contrast value.

Furthermore, the controller 214 calculates a contrast value from image data obtained by the imaging element 202 when the focus lens is continuously driven. The controller 214 then sends an instruction to the focus lens controller 104 to stop the focus lens at a position where the contrast value becomes a peak value (a peak position) as an in-focus position. Herein, when a change of a discretely-obtained contrast value from an increase to a decrease is detected, the peak position is calculated by an interpolation calculation based on a lens position corresponding to the peak value of a discrete contrast value and lens positions corresponding to the constant values before and after the peak value.

In step S5, the controller 214 has an unillustrated temporary storage unit store the peak value of the contrast value. Thereafter, the processing proceeds to step S12.

If an amount of blurriness is small, in other words, the lens is in focus in step S3, the controller 214 has the imaging element 202 execute an imaging operation in step S6. Thereafter, the controller 214 has the temporary storage unit, not shown in the drawings, store image data obtained by the imaging operation. In step S7, the controller 214 calculates a contrast value from the image data obtained by the imaging element 202.

In step S8, the controller 214 determines whether there is a change in the contrast value calculated from the peak value of the contrast value which is temporarily stored in step S5. Herein, the temporarily-stored peak value of the contrast value is a peak value obtained by the scan focus control, and is stored as a contrast value in an in-focus state. In step S8, if it is determined that the contrast value is changed, in other words, if it is determined that the in-focus state is changed to an out-of-focus state, the processing proceeds to step S9. If it is determined in step S8 that there is no change in the contrast value, in other words, the in-focus state is maintained, the processing proceeds to step S12.

In step S9, the controller 214 starts the wobbling AF control. The controller 214 sends an instruction to the focus lens controller 104 to start minute driving of the focus lens in a near focus direction and an infinite focus direction. Therefore, the controller 214 drives the focus lens minutely, and calculates contrast values from image data obtained by the imaging element 202 at both of the near focus edge and the infinite focus edge of an amplitude of the minute driving. Thus, the controller 214 determines a drive direction of the focus lens by comparing both of the contrast values. Furthermore, if a peak value is detected when it is detected that both of the contrast values are nearly equal as a result of comparing the contrast values, the controller 214 sends an instruction to the focus lens controller 104 to stop the focus lens. After determining the drive direction of the focus lens, the processing proceeds to step S10. Herein, the drive cycle of the focus lens in the wobbling AF control according to the present embodiment is set to the extent that, for example, a drive direction can be determined once per two frames.

In step S10, the controller 214 performs image synthesis processing. After the image synthesis processing, the processing proceeds to step S11. If the wobbling AF control has been started, a display image and a moving image recording image may be degraded due to lens drive. To prevent image degradation of this kind, image synthesis processing is performed. The details of the image synthesis processing will be described later.

In step S11, the controller 214 has the display 206 display an image as a Live View image based on the image data obtained as a result of the image synthesis processing. After that, in step S16, the controller 214 performs moving image recording. In other words, the controller 214 stores the image synthesis-processed image data in a moving image file which is generated in the recording medium 208. After the moving image recording, the processing returns to step S3.

In step S12, the controller 214 performs ordinary image processing using the image processor 204. The ordinary image processing is image processing without image synthesis processing, and includes processing necessary for image display, such as white balance processing and graduation correction processing. After the ordinary image processing, the processing proceeds to step S13. The ordinary image processing is performed when, for example, the focus lens is at an in-focus position. Since no lens drive is performed with the wobbling AF control in this case, the ordinary image processing is performed.

In step S13, the controller 214 has the display 206 display an image as a Live View image based on image data obtained as a result of the ordinary image processing. Thereafter, the processing proceeds to step S14.

In step S14, the controller 214 performs moving image recording. In other words, the controller 214 stores the image data obtained by the imaging element 202 in a moving image file generated in the recording medium 208. After the moving image recording, the processing proceeds to S15.

In step S15, the controller 214 determines whether or not the moving image capturing in the imaging apparatus 1 should be finished. For example, when an operating member, not shown in the drawings, to instruct the finish of the moving image capturing is operated, it is determined that the moving image capturing is finished. If it is determined that the moving image capturing is not to be finished in step S15, the processing returns to step S3. If it is determined that the moving image capturing is to be finished in step S15, the processing shown in FIG. 2 is finished.

Figure 3:
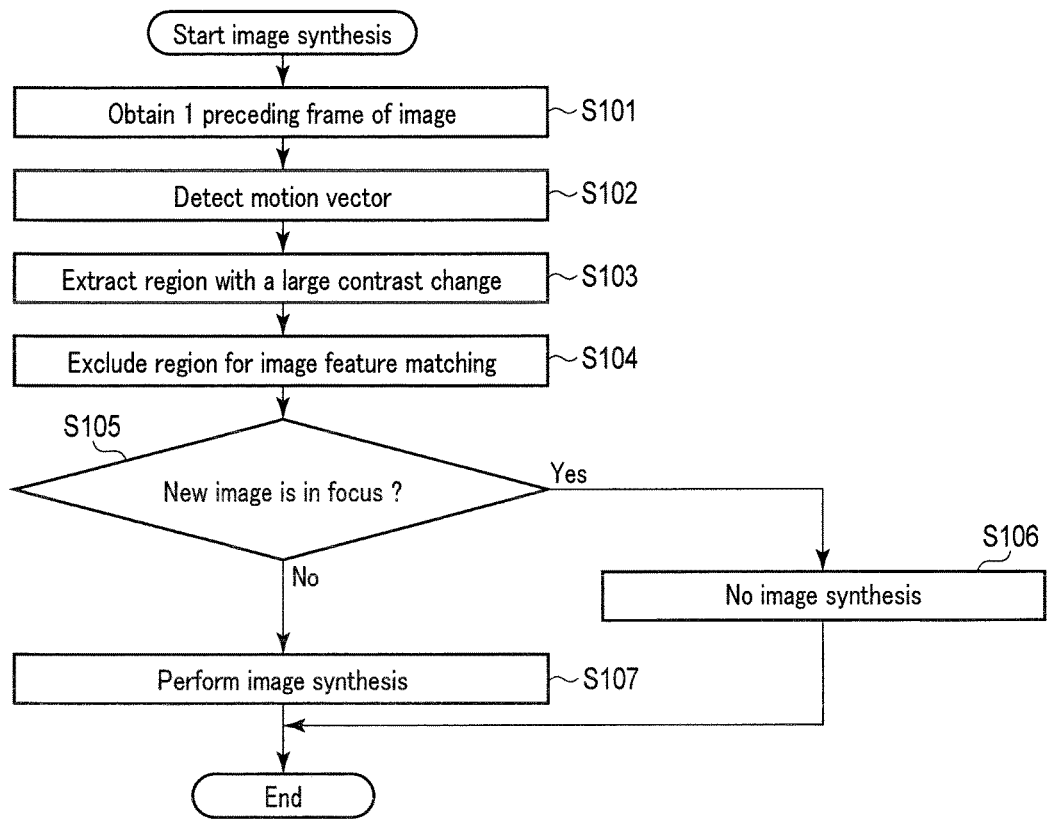
FIG. 3 is a flowchart showing image synthesis processing according to the first embodiment.

FIG. 3 is a flowchart showing image synthesis processing according to the first embodiment. In step S101, the controller 214 obtains image data obtained in step S6 in the immediately-preceding frame. In other words, the controller 214 reads the image data stored in the temporary storage unit.

In step S102, the controller 214 detects a motion vector of an object between image data of a current frame and image data of an immediately-preceding frame, using the motion detector 210.

Figure 4A:
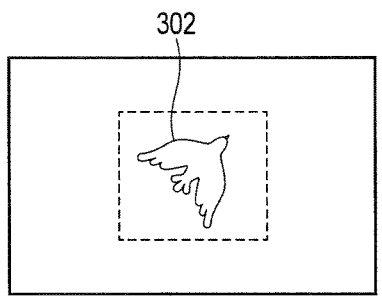
FIGS. 4A and 4B are explanatory drawings of extracting processing for a region with a large change in contrast.
Figure 4B:
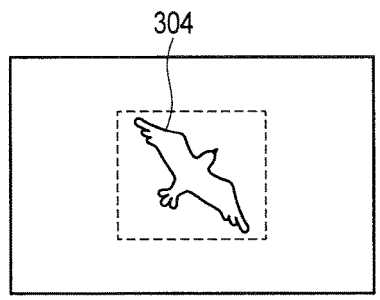

In step 103, after adjusting the positions of the image data of the current frame and the image data of the immediately-preceding frame in accordance with the motion vector, the controller 214 extracts a region with a large change in contrast values in the image data of the current frame, by comparing the image data in the current frame and the image data in the immediately-preceding frame. For example, the controller 214 extracts, from the entire region of image data of the current frame, a region with a change of 10% or more in contrast values in comparison to the contrast values of image data in the immediately-preceding frame. The position of the focus lens changes in real time during the wobbling AF control. Furthermore, the contrast of an object in a region 302 shown in FIG. 4A and a region 304 shown in FIG. 4B changes along with the change of the position of the focus lens. In step S103, regions, such as the region 302 shown in FIG. 4A and the region 304 shown in FIG. 4B, are extracted. It can be inferred that an object exists in these regions.

In step S104, the controller 214 performs image feature point matching between the image data of the current frame and the image data of the immediately-preceding frame. Therefore, the controller 214 excludes a region with low similarity between the image data of the current frame and the image data of the immediately-preceding frame from a target for later image synthesis. The image feature point matching is performed through calculating a difference in amounts of image features between pixels (e.g., pixel values) corresponding to the image data of two frames. If the difference is small, the similarly between the pixels is determined to be high.

In step S105, the controller 214 determines whether or not the image data of the current frame is in an in-focus state. In other words, the controller 214 determines whether or not a peak position is detected by the wobbling AF control. If it is determined that the image data of the current frame is in an in-focus state in step S105, the processing proceeds to step S106. If it is determined that the image data of the current frame is not in an in-focus state in step S105, the processing proceeds to step S107.

In step S106, the controller 214 only performs ordinary image processing and does not perform image synthesis, which is explained later with reference to step S107. Thereafter, the processing shown in FIG. 3 is finished. Since no blurriness occurs in the image in step S106, it is unnecessary to perform image synthesis to suppress blurriness.

Figure 5:
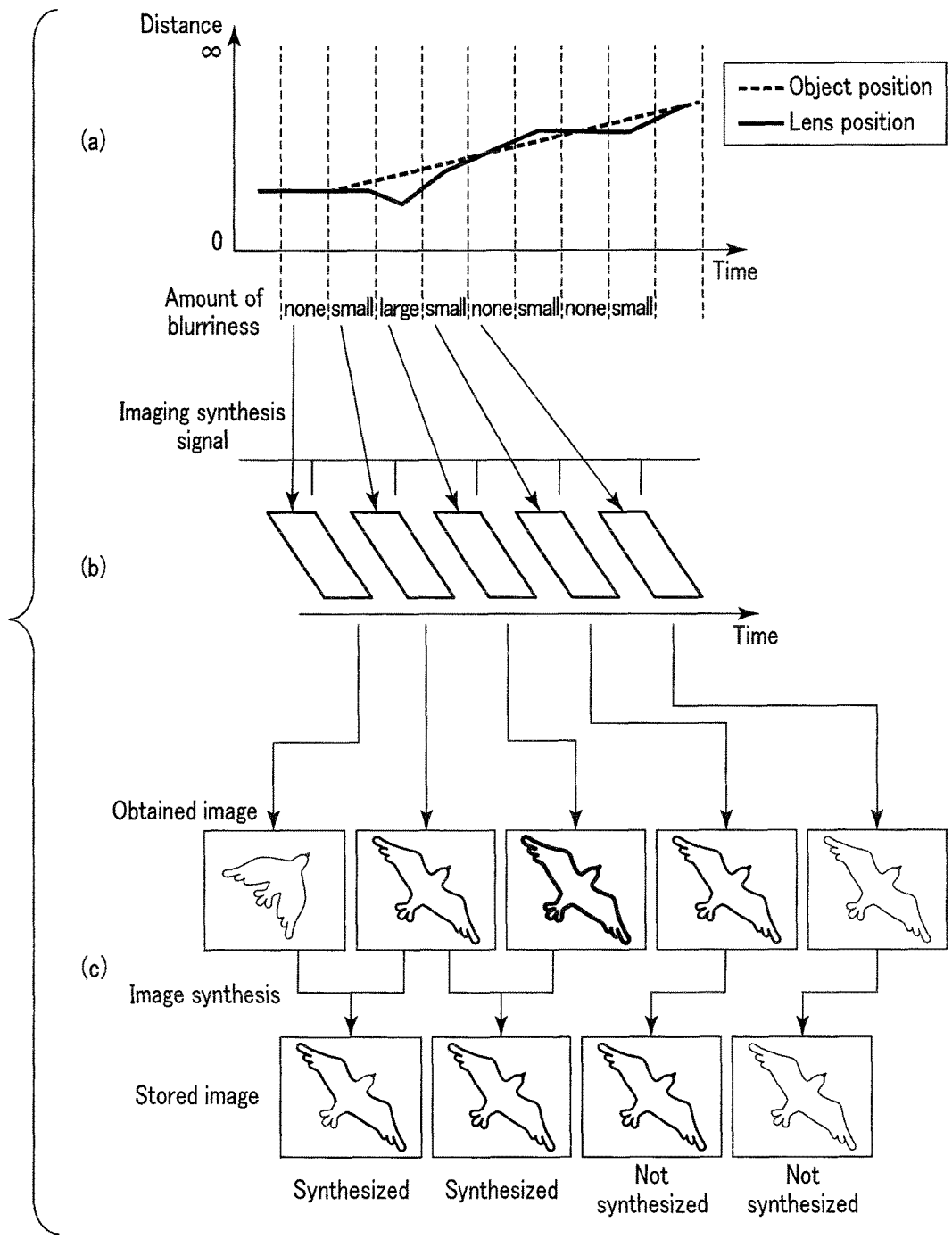
FIG. 5 is a drawing for explaining image synthesis.

In step S107, the controller 214 performs image synthesis using the image processor 204. Thereafter, the processing shown in FIG. 3 is finished. The image synthesis will be described below. FIG. 5 is a drawing explaining image synthesis. In the following examples, a user intends to take a moving image of a bird which is about to take flight as an object.

FIG. 5 (a) is a drawing explaining the relationship among the object position, the lens position (an image capturing distance corresponding to the lens position), and an amount of blurriness, with respect to elapsed time during the wobbling AF control. When the wobbling AF control is started, the focus lens focuses on the bird as an object. Therefore, there is no amount of blurriness. Thereafter, upon the bird taking flight, the object position changes as the time passes with respect to a long distance side, as shown in FIG. 5 (a). Thus, since the contrast value is changed, the wobbling AF control is performed so as to follow the bird's movement. As shown in FIG. 5 (a), in the wobbling AF control, the lens is driven in both a near focus direction and an infinite focus direction so as to ultimately focus an object. Thus, an amount of blurriness also changes when the lens position is changed as shown in FIG. 5 (a). In other words, if a difference between the object position and the lens position is large, the amount of blurriness is deemed "large", and the difference is small, the amount of blurriness is deemed "small", and if there is no difference, the amount of blurriness is deemed "none".

FIG. 5 (b) is a drawing indicating a timing of imaging during the wobbling AF control. The imaging during the wobbling AF control is based on an imaging synchronizing signal that is synchronized with the timing of the lens driving. Accordingly, if imaging is performed at the timing when an amount of blurriness is large, the amount of blurriness of the image data obtained by the imaging becomes large, and if imaging is performed at the timing when an amount of blurriness is small, the amount of blurriness of the image data obtained by the imaging becomes small. In the example shown in FIG. 5 (b), the state of blurriness continuously changes. Thus, the state of blurriness continuously changes even in a Live View image. This would give discomfort to a user.

FIG. 5 (c) illustrates a concept underlying the image synthesis. The image synthesis is performed by replacing a blurry region in image data of a current frame with a non-blurry region in image data of an immediately-preceding frame. Accordingly, the image synthesis is performed in a second frame and thereafter. A blurry region and a non-blurry region in the image data are extracted as regions having a large change in contrast values in step S103 shown in FIG. 3.

To explain image synthesis for image data of a second frame and thereafter in FIG. 5 (c), for example, if the region extracted from the image data of the second frame and the region extracted from the image data of the first frame are compared, the former has a lesser amount of blurriness than the latter. Accordingly, the image processor 204 usually replaces a region with a large amount of blurriness extracted from image data of the second frame with a region with a small amount of blurriness extracted from the first frame. However, if the region extracted from image data of the second frame is compared with the region extracted from image data of the first frame, the state of the fluttering of the bird's wings is different between the first frame and the second frame. Accordingly, the part corresponding to the bird's wings is excluded from the image synthesis target in step S104 in FIG. 3. Accordingly, the image processor 204 does not replace the bird's wings, but replaces the other regions with the region extracted from the first frame, as shown in FIG. 5 (c).

To explain image synthesis for image data of the third frame in FIG. 5 (c), if the region extracted from the image data of the third frame and the region extracted from the image data of the second frame are compared, the latter has a smaller amount of blurriness than the former. Accordingly, the image processor 204 usually replaces the region with a large amount of blurriness extracted from image data of the third frame with the region with a small amount of blurriness extracted from the second frame. Different from the image synthesis for the image data of the second frame, if the region extracted from image data of the third frame is compared with the region extracted from image data of the second frame, the status of the bird is about the same between the third frame and the second frame. Accordingly, the image processor 204 replaces the entire region extracted from the image data of the third frame with the region extracted from the second frame, as shown in FIG. 5 (c).

In contrast, in the image synthesis for image data of the fourth and fifth frames in FIG. 5 (c), image data of a current frame has a smaller amount of blurriness than the amount of blurriness in the preceding frame. Accordingly, the image processor 204 does not perform image synthesis.

Figure 6:
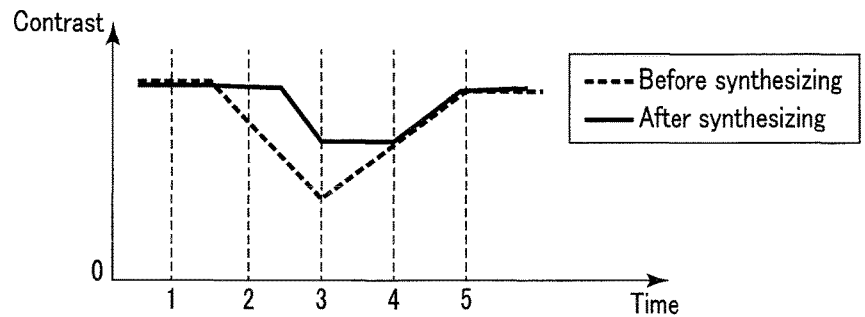
FIG. 6 is a diagram showing a comparison between a contrast when image synthesis is performed and a contrast when image synthesis is not performed in the example of FIG. 5.

FIG. 6 is a diagram showing a comparison between a contrast when image synthesis is performed and a contrast when image synthesis is not performed in the example of FIG. 5. As shown in FIG. 6, the contrast in the second frame and in the third frame (i.e., blurriness) is improved by image synthesis.

As explained in the foregoing, according to the present embodiment, if a blurry image is displayed when a Live View display is performed even during AF, a blurry part in a current frame is replaced with a non-blurry image of a preceding frame by image synthesis. It is possible to reduce an amount of blurriness during a Live View display during AF by such kind of simple processing.

Furthermore, as a result of comparing image data of two frames, a part having a different amount of image characteristics is excluded from the image synthesis target even if the part has a large amount of blurriness. Thus, it is possible to prevent causing an image to be more unnatural as a consequence of the replacement, while preventing blurriness in the entire image.

Herein, the image synthesis according to the foregoing embodiment is replacement processing. On the other hand, synthesis may be carried out by calculating an addition average between image data of a current frame and image data of a preceding frame. Synthesis may also be carried out by a weighted addition in accordance with an amount of blurriness. The weighting coefficient of this weighted addition takes a value between 0 and 1, for example. Furthermore, a value of a weighting coefficient for image data with a smaller amount of blurriness among image data of two frames is set to be greater than a value of a weighting coefficient for image data with a larger amount of blurriness.

In the foregoing example, image synthesis for two frames, i.e., for image data of a current frame and image data of a preceding frame, is explained. However, image synthesis for three or more frames, i.e., image data of a current frame and image data of frames before the immediately-preceding frame, may be carried out.

Second Embodiment

Next, the second embodiment of the present invention is described. The second embodiment is a modification of image synthesis. In the first embodiment, any parts having a different amount of image features are equally excluded from the image synthesis target as a result of comparing image data of two frames. In contrast, the second embodiment is an example of performing image synthesis by a weighted addition in accordance with a level of similarity in the amount of image features.

Figure 7:
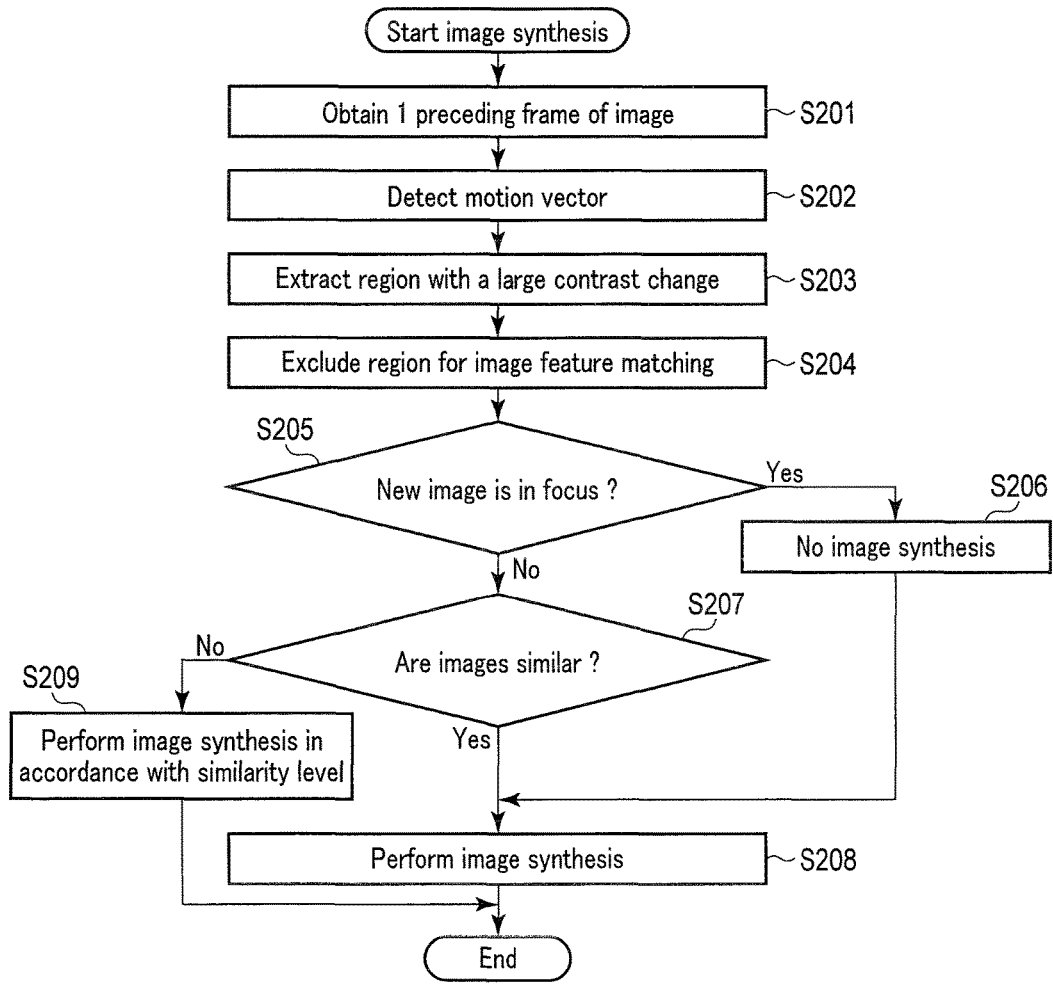
FIG. 7 is a flowchart showing image synthesis processing according to a second embodiment.

FIG. 7 is a flowchart showing image synthesis processing according to the second embodiment. Herein, of the steps shown in FIG. 7, the same steps as those shown in FIG. 3 will not be described. In other words, the description of steps S201 to S206 of FIG. 7, which are the same as steps S101 to 106 of FIG. 3, will be omitted.

In step S207, if it is determined that image data of the current frame is not in an in-focus state in step S205, the controller 214 determines whether or not a region extracted from the image data of the current frame is similar to a region extracted from the image data of the preceding frame. The determination as to whether the image data of two frames are similar or not is made by, for example, determining whether or not a similarity level (which is calculated based on a difference in image feature amounts) between two frames is greater than a predetermined value. If the similarity level is greater than a predetermined value, the image data of two frames is determined to be similar. If it is determined in step S207 that a region extracted from the image data of the current frame and a region extracted from the image data of the preceding frame are similar, the processing proceeds to step S208. If it is determined in step S207 that a region extracted from the image data of the current frame and a region extracted from the image data of the preceding frame are not similar, the processing proceeds to step S209.

In step S208, the controller 214 performs image synthesis using the image processor 204. Thereafter, the processing shown in FIG. 7 is finished. The image synthesis is the same as the image synthesis in step S107 of the first embodiment. The description thereof is thus omitted.

In step S209, the controller 214 performs image synthesis in accordance with a similarity level using the image processor 204. Thereafter, the processing shown in FIG. 7 is finished. The image synthesis is performed by a weighted addition in accordance with a similarly level. The weighting coefficient of this weighted addition takes a value between 0 and 1, for example. Furthermore, the lower the similarity level is, the greater the weighting coefficient for image data of a current frame is set and the smaller the weighting coefficient for image data of a preceding frame is set. In other words, image data of a current frame is prioritized if a similarly level is low. Furthermore, when the region extracted from the image data of the current frame and the region extracted from the image data of the preceding frame are not similar at all, the image data are excluded from the image synthesis target.

As described in the foregoing, according to the present embodiment, image synthesis based on a similarity level is combined as image synthesis if the amount of image characteristics is different. Thus, it is possible to prevent influences on images due to a misalignment of a synthesized object and a state change of an object.

Other Modifications

Figure 8:
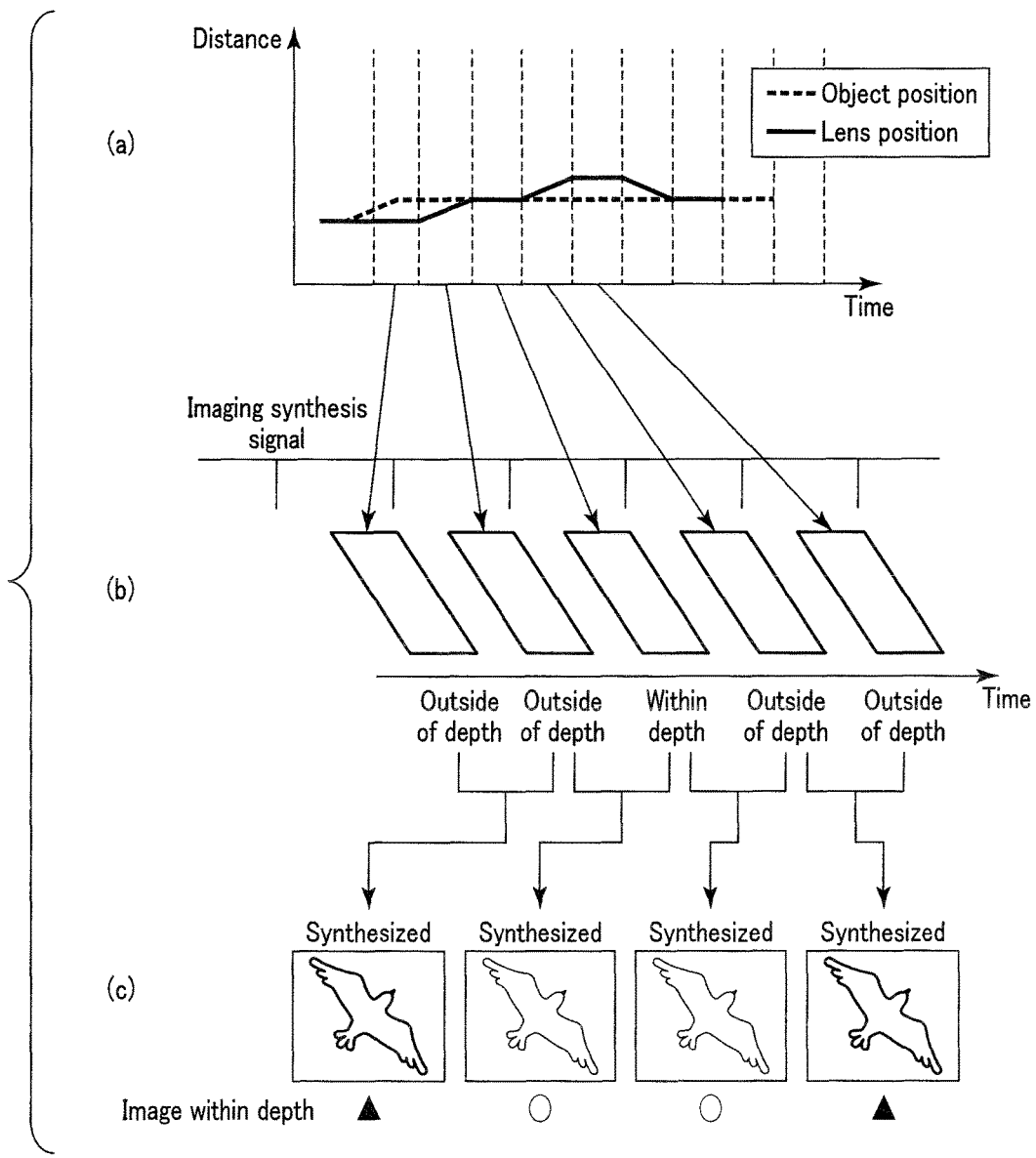
FIG. 8 is a drawing for explaining modifications.

Modifications of the foregoing embodiments will be described. FIG. 8 is a drawing explaining image synthesis according to the modifications. Similar to FIG. 5, FIG. 8 (a) is a drawing explaining the relationship among the object position, the lens position (an image capturing distance corresponding to the lens position), and an amount of blurriness, with respect to elapsed time during the wobbling AF control. FIG. 8 (b) is a drawing indicating the timing of imaging during the wobbling AF control. FIG. 8 (c) illustrates a concept underlying the image synthesis. In FIG. 8, lens driving is performed once per two frames so that an in-focus time can be secured as long as possible. Such driving method is effective when an object does not move very much.

In the wobbling drive, the lens is driven in both a near focus side and an infinite focus side. Accordingly, if lens driving is performed once per frame, an amount of blurriness often changes. In contrast, in the driving like the driving as shown in FIG. 8, especially when an object does not move so much, a state of an amount of blurriness does not often change.

On the other hand, since a state of an amount of blurriness does not often change, image data having the same state of an amount of blurriness may be combined in the example of FIG. 8, unlike the example of FIG. 5. Herein, if a moving amount of an object is small as shown in FIG. 8, image data (shown as the black triangle in the drawing) within a depth with a relatively large amount of blurriness that is generated by image synthesis of two sets of image data outside of a depth, and image data (shown as the white circle in the drawing) within a depth with a relatively small amount of blurriness that is generated by image synthesis of image data outside of a depth and image data within a depth, may be generated. If lens drive is performed once per two frames, image data within a depth is generated once per three frames. If image data outside of a depth and image data within a depth are generated on a regular basis, blurriness in an image can be averaged by an interpolation effect of the human brain function when those images are displayed by Live View.

The present invention has been described based on the embodiments, but the present invention is in no way limited to those embodiments. The present invention can of course be modified in various manners, without departing from the spirit and scope of the invention. For example, an example of AF performed with wobbling drive is described in the foregoing embodiments. On the other hand, the technique of the present embodiments is applicable to various AF processing performed with lens drive during Live View display. For example, the technique of the present embodiments may be applied to phase-difference AF.

In the foregoing description of each operation flowchart, the operations are described using expressions, such as "first" and "next" for convenience; however, the operations are not necessarily operated in the described order.

The processing described in relation to the above embodiments may be stored in the form of programs executable by the controller 214 (which is a computer). The programs can be stored in storage mediums of external storage devices, such as a magnetic disk, an optical disk, or a semiconductor memory, and may be distributed. The controller 214 reads the programs from a storage medium of an external storage device, and the operations can be executed and controlled based on the read programs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    an imaging element which performs image capturing of an object a plurality of times to obtain a plurality of frames of image data of the object;
    an imaging lens including a focus lens and used for generating an image of the object in the imaging element;
    an AF controller which controls a focus state of the imaging lens by controlling drive of the focus lens;
    an image synthesis circuit which synthesizes a region with a large amount of blurriness, which is due to a lack of focus, in image data of a current frame and a region with a large degree of similarity with respect to an amount of image characteristics with the region with a large amount of blurriness due to a lack of focus, and with a smaller amount of blurriness due to a lack of focus than the amount of blurriness of the region with a large amount of blurriness in image data of a preceding frame obtained before the image data of the current frame, among the plurality of image data obtained by the imaging element by the plurality of times of image capturing during the drive of the focus lens; and
    a display which displays an image synthesized by the image synthesis circuit.

2. The imaging apparatus according to claim 1, wherein the image synthesis circuit excludes a region having a small amount of blurriness and a low level of similarity in an amount of image feature with a region having a large amount of corresponding blurriness.

3. The imaging apparatus according to claim 1, wherein the image synthesis circuit synthesizes the region having a small amount of blurriness due to a lack of focus by applying a weight in accordance with a level of similarity in an amount of image feature with a region having a large amount of corresponding blurriness due to a lack of focus.

4. The imaging apparatus according to claim 1, further comprising a motion detector which detects a motion of the object in the plurality of image data obtained by the imaging element when the focus lens is driven,
    wherein the image synthesis circuit performs the synthesis after adjusting positions of image data of the current frame and image data of the preceding frame in accordance with the motion.

5. The imaging apparatus according to claim 1, wherein the AF controller performs wobbling drive on the focus lens.

6. The imaging apparatus according to claim 1, wherein the AF controller performs wobbling drive on the focus lens, and
    wherein the imaging element performs the image capturing of an object a plurality of times to obtain a plurality of frames of image data of the object during the wobbling drive of the focus lens.

7. An imaging method comprising:
    performing image capturing of an object a plurality of times to obtain a plurality of frames of image data of the object;
    driving of a focus lens during an autofocus operation;
    synthesizing a region with a large amount of blurriness, which is due to a lack of focus, in image data of a current frame and a region with a large degree of similarity with respect to an amount of image characteristics with the region with a large amount of blurriness due to a lack of focus, and with a smaller amount of blurriness due to a lack of focus than the amount of blurriness of the region with a large amount of blurriness in image data of a preceding frame obtained before the image data of the current frame, among the plurality of image data obtained by the imaging element by the plurality of times of image capturing during the drive of the focus lens; and
    displaying an image synthesized by the image synthesis circuit.

* * * * *